United States Patent
Cheng

(10) Patent No.: US 7,107,194 B2
(45) Date of Patent: Sep. 12, 2006

(54) HIGH FIDELITY LOW-ORDER MODELING FOR MULTI-STAGED SEPARATION PROCESSES BASED UPON THE COMPARTMENTAL APPROACH

(75) Inventor: Wai Biu Cheng, Willoughby, OH (US)

(73) Assignee: ABB Inc., Norwalk, CT (US)

( * ) Notice: Subject to any disclaimer, the term of this patent is extended or adjusted under 35 U.S.C. 154(b) by 474 days.

(21) Appl. No.: 10/694,113

(22) Filed: Oct. 27, 2003

(65) Prior Publication Data

US 2005/0091020 A1    Apr. 28, 2005

(51) Int. Cl.
- G06G 7/48    (2006.01)
- G05B 21/00    (2006.01)
- B01D 3/42    (2006.01)

(52) U.S. Cl. ............... 703/6; 703/22; 203/1; 700/270; 700/273

(58) Field of Classification Search ............... 703/2, 703/6, 12, 22; 700/266, 270, 273; 203/1, 203/3; 210/640; 706/45
See application file for complete search history.

(56) References Cited

U.S. PATENT DOCUMENTS

| | | | | |
|---|---|---|---|---|
| 4,526,657 | A * | 7/1985 | Hobbs et al. ............... | 203/3 |
| 4,544,452 | A * | 10/1985 | Halliday et al. ............ | 203/1 |
| 5,784,538 | A * | 7/1998 | Dzyacky ...................... | 706/45 |
| 6,088,630 | A * | 7/2000 | Cawlfield ................... | 700/266 |
| 6,605,190 | B1 * | 8/2003 | Salamon et al. ............ | 203/1 |
| 2004/0182786 | A1 * | 9/2004 | Colling et al. ............. | 210/640 |

OTHER PUBLICATIONS

Kreul et al., L.U. Dynamic Catalytic Distillation: Advanced Simulation and Experimental Validation, Computers & Chemical Engineering, vol. 22, Supplement 1, Mar. 1998, pp. S371-S378.*
Nataraj, P.S.V. Robust Multivariable Feedback Design for an Extractive Distillation Column, IEEE, International Conference on Control, vol. 2, Mar. 1994, pp. 1554-1559.*
Tham et al., M.T. Multivariable and Multirate Self-Tuning Control: A Distillation Column Case Study, IEE Proceedings, Control Theory and Applications, vol. 138, No. 1, Jan. 1991, pp. 9-24.*
Zhang, J. Inferential Feedback Control of Distillation Composition Based on PCR and PLS Models, IEEE, Proceedings of the 2001 American Control Conference, vol. 2, Jun. 2001, pp. 1196-1201.*
Ahmed et al., M.H. Multivariable Inferential Feedback Control of Distillation Compositions Using Dynamic Principal Component Regression Models, IEEE, Proceedings of the 2003 American Control Conference, vol. 3, Jun. 2003, pp. 1974-1979.*
Rehm et al., A. Nonlinear H¥ -Control of a High Purity Distillation Column, IEEE, International Conference on Control '96, Sep. 1996, pp. 1178-1183.*

* cited by examiner

*Primary Examiner*—Russell Frejd

(74) *Attorney, Agent, or Firm*—Michael M. Rickin

(57) ABSTRACT

A new way of applying the compartmental approach to the simulation of multi-stage separation processes in the process industry leads to more robust simulation models and higher success rate. The new approach makes use of steady-state component balances, constant vapor-liquid equilibrium ratios, and initialization models. Guidelines are provided for creating a computer executable regular model of the multi-stage separation process. Guidelines are also provided for creating a computer executable model that solves the problem of initialization failure of the regular model for the process.

12 Claims, 1 Drawing Sheet

COLUMN AS COMPARTMENT

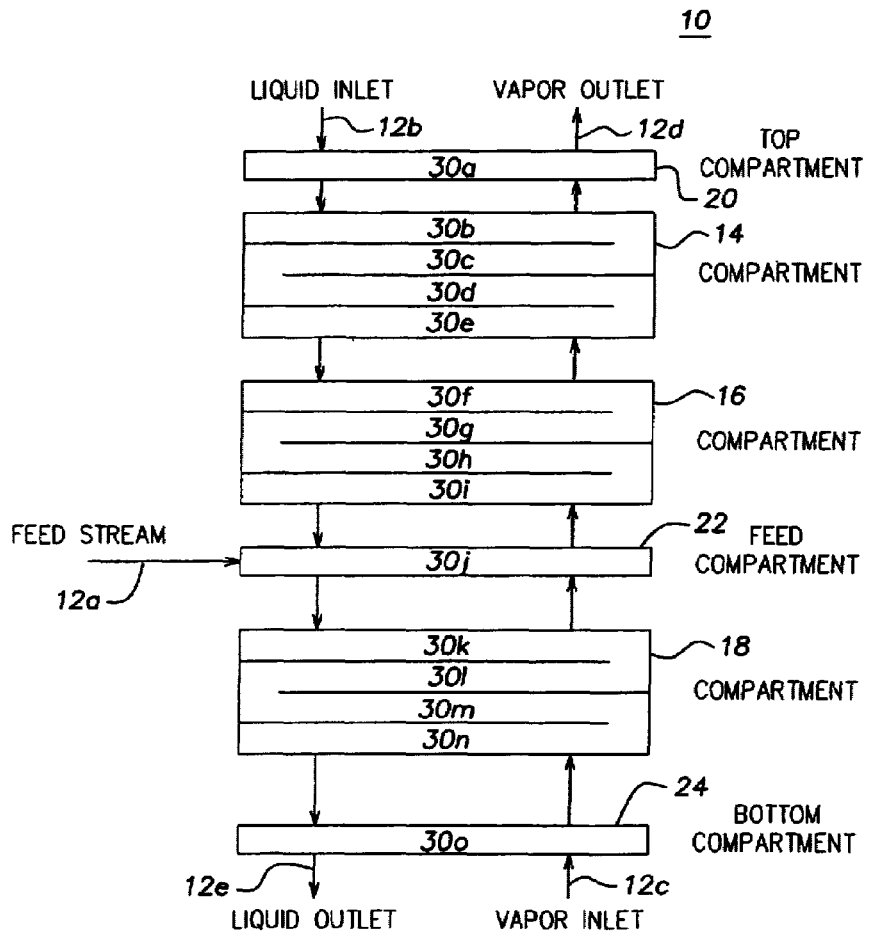
COLUMN AS COMPARTMENT

HIGH FIDELITY LOW-ORDER MODELING FOR MULTI-STAGED SEPARATION PROCESSES BASED UPON THE COMPARTMENTAL APPROACH

FIELD OF THE INVENTION

This invention relates to process systems engineering and more particularly to the simulation of separation processes in the process industries.

DESCRIPTION OF THE PRIOR ART

Process engineering involves the design of a wide variety of processing plants and processes carried out therein. Such processes include, but are not limited to, chemical, petrochemical, refining, pharmaceutical, and polymer industries. In process engineering, the use of computer based models to develop and evaluate new processes, design and retrofit plants, and optimize the operation of existing plants is rapidly becoming a standard. At every stage of process design, development and operation, rigorous models generated by process simulation software systems can be used to make better engineering and business decisions.

In a process simulation software system, the performance of a process industry plant in which there is a continuous flow of materials and energy through a network of process units is simulated. The process unit can include equipment, such as distillation columns, retaining vessels, heating units, pumps, conduits, etc. Typically, the process simulation software features computer models that allow process engineers to simulate the operation of various pieces of equipment used in a proposed or existing manufacturing process. The end results from the simulation software system provide a display of the simulated performance of the plant under various conditions and estimate of the capital and operating cost of the plant and its profitability.

Multi-staged separation processes are used in the chemical industry in applications such as distillation columns. The prior art has not found it easy to solve the dynamic response of such processes in a reasonably short time through modeling while maintaining model fidelity for on-line application purposes.

In the most rigorous applications of dynamic simulation of stage-wise separation processes, high order models are usually employed. These models typically involve the solutions of material and energy balance equations for every stage of the process. The high dimensionality of these models, however, make them impractical in those applications such as on-line optimization and control, and dynamic data reconciliation where time consideration is important. In these applications, solutions must be obtained within a limited time frame.

Several low order methods that involve significantly fewer differential equations, such as linearization with model reduction and orthogonal collocation, have been proposed in the engineering literature. However, they are all deficient in some respects. For example, linearization with model reduction would render the model parameters with no physical significance, while the orthogonal collocation approach would give results that may not match the discrete nature of real world problems.

The academic research project reported by Benallou A., Seborg, D. E., and Mellichamp, D. A., "Dynamic Compartmental Models For Separation Processes", AIChE Journal, vol 32(7), pp. 1067–1078 (July, 1986) resulted in the development of the compartmental approach for distillation column applications. The academic research projects reported by Horton, R. R., Bequette, B. W., and Edgar, T. F., "Improvements In Dynamic Compartmental Modeling For Distillation", Computers and Chemical Engineering, vol. 15(3), pp. 197–201 (1991); and Musch, H. E. and Steiner, M., "Order Reduction Of Rigorous Dynamic Models For Distillation Columns", Computers and Chemical Engineering, vol. 17S, pp. S311–S316 (1993), have resulted in refinements to the compartmental approach. All three of these methods, however, suffer from the following deficiencies:

1. Difficulties in initialization; and
2. Difficulties in converging to a solution.

The present invention addresses these deficiencies and thus adapts more readily to real world problems.

SUMMARY OF THE INVENTION

A medium having instructions which when executed perform steps for creating a regular model for a multi-stage separation process having feed trays, reboiler return trays and condenser return trays and one or more additional trays that allows the regular model to converge to a solution comprising:

(a) lumping each of the one or more additional trays into an associated compartment that comprises one or more of the one or more additional trays that are not in another associated compartment;

(b) treating the feed trays, reboiler return trays and the condenser return trays as one tray compartments;

(c) designating one of the one or more additional trays in each of the associated compartments comprising one or more additional trays as a sensitive tray;

(d) equating liquid holdup in each of the compartments to the total liquid holdup of the trays in each of the compartments;

(e) ignoring vapor holdup in each of the compartments;

(f) calculating phase equilibria in an associated compartment only for the sensitive tray;

(g) presuming that all trays other than the sensitive trays in each of the associated compartments respond instantaneously to liquid and vapor flow;

(h) basing temperatures of all trays other than the sensitive trays in each of the associated compartments on linear interpolation between the temperature at each of two adjacent sensitive trays; and (i) causing the regular model to converge to a solution.

A medium having instructions which when executed perform steps for creating an initialization model for a multi-stage separation process having feed trays for receiving a feed stream flow, reboiler return trays for providing a liquid flow to a reboiler and receiving from the reboiler a vapor flow and condenser return trays for providing a vapor flow to a condenser and receiving from the condenser a liquid flow and one or more compartments with multiple trays having vapor and liquid streams flowing therethrough that generates a set of initial values for a regular model of the process, comprising:

(a) converting all of the differential equations in the regular model to steady state equations by setting the derivative term of all of the differential equations to zero;

(b) taking the temperature of the condenser return tray as the average of the temperatures of the liquid flow from the condenser and the feed stream flow;

(c) taking the temperature of the reboiler return tray as the average of the temperatures of the vapor flow from the reboiler and the feed stream flow;

(d) taking the liquid flow in the condenser return tray to be the same as the liquid flow from the condenser;

(e) taking the vapor flow in the reboiler return tray to be the same as the vapor flow from the reboiler;

(f) taking the liquid flow in the feed tray as the sum of the liquid flow from the condenser and the feed stream flow;

(g) assuming that all of the trays have 100% efficiency;

(h) assuming there is no interaction between the vapor and liquid flows through the compartments with multiple trays; and (i) generating a set of initial values for a regular model of the process.

A method for creating a regular model for a multi-stage separation process having feed trays, reboiler return trays and condenser return trays and one or more additional trays that allows the regular model to converge to a solution. The method is:

(a) lumping each of the one or more additional trays into an associated compartment that comprises one or more of the one or more additional trays that are not in another associated compartment;

(b) treating the feed trays, reboiler return trays and the condenser return trays as one tray compartments;

(c) designating one of the one or more additional trays in each of the associated compartments comprising one or more additional trays as a sensitive tray;

(d) equating liquid holdup in each of the compartments to the total liquid holdup of the trays in each of the compartments;

(e) ignoring vapor holdup in each of the compartments;

(f) calculating phase equilibria in an associated compartment only for the sensitive tray;

(g) presuming that all trays other than the sensitive trays in each of the associated compartments respond instantaneously to liquid and vapor flow;

(h) basing temperatures of all trays other than the sensitive trays in each of the associated compartments on linear interpolation between the temperature at each of two adjacent sensitive trays; and (i) causing the regular model to converge to a solution.

A method of process engineering which comprises creating a regular model for a multi-stage separation process having feed trays, reboiler return trays and condenser return trays and one or more additional trays that allows the regular model to converge to a solution according to prescribed guidelines, the guidelines comprise:

(a) lumping each of the one or more additional trays into an associated compartment that comprises one or more of the one or more additional trays that are not in another associated compartment;

(b) treating the feed trays, reboiler return trays and the condenser return trays as one tray compartments;

(c) designating one of the one or more additional trays in each of the associated compartments comprising one or more additional trays as a sensitive tray;

(d) equating liquid holdup in each of the compartments to the total liquid holdup of the trays in each of the compartments;

(e) ignoring vapor holdup in each of the compartments;

(f) calculating phase equilibria in an associated compartment only for the sensitive tray;

(g) presuming that all trays other than the sensitive trays in each of the associated compartments respond instantaneously to liquid and vapor flow;

(h) basing temperatures of all trays other than the sensitive trays in each of the associated compartments on linear interpolation between the temperature at each of two adjacent sensitive trays; and (i) causing the regular model to converge to a solution.

A method for creating an initialization model for a multi-stage separation process having feed trays for receiving a feed stream flow, reboiler return trays for providing a liquid flow to a reboiler and receiving from the reboiler a vapor flow and condenser return trays for providing a vapor flow to a condenser and receiving from the condenser a liquid flow and one or more compartments with multiple trays having vapor and liquid streams flowing therethrough that generates a set of initial values for a regular model of the process. The method is:

(a) converting all of the differential equations in the regular model to steady state equations by setting the derivative term of all of the differential equations to zero;

(b) taking the temperature of the condenser return tray as the average of the temperatures of the liquid flow from the condenser and the feed stream flow;

(c) taking the temperature of the reboiler return tray as the average of the temperatures of the vapor flow from the reboiler and the feed stream flow;

(d) taking the liquid flow in the condenser return tray to be the same as the liquid flow from the condenser;

(e) taking the vapor flow in the reboiler return tray to be the same as the vapor flow from the reboiler;

(f) taking the liquid flow in the feed tray as the sum of the liquid flow from the condenser and the feed stream flow;

(g) assuming that all of the trays have 100% efficiency;

(h) assuming there is no interaction between the vapor and liquid flows through the compartments with multiple trays; and (i) generating a set of initial values for a regular model of the process.

A method of process engineering which comprises creating an initialization model for a multi-stage separation process having feed trays for receiving a feed stream flow, reboiler return trays for providing a liquid flow to a reboiler and receiving from the reboiler a vapor flow and condenser return trays for providing a vapor flow to a condenser and receiving from the condenser a liquid flow and one or more compartments with multiple trays having vapor and liquid streams flowing therethrough that generates a set of initial values for a regular model of the process, according to prescribed guidelines, the guidelines comprise:

(a) converting all of the differential equations in the regular model to steady state equations by setting the derivative term of all of the differential equations to zero;

(b) taking the temperature of the condenser return tray as the average of the temperatures of the liquid flow from the condenser and the feed stream flow;

(c) taking the temperature of the reboiler return tray as the average of the temperatures of the vapor flow from the reboiler and the feed stream flow;

(d) taking the liquid flow in the condenser return tray to be the same as the liquid flow from the condenser;

(e) taking the vapor flow in the reboiler return tray to be the same as the vapor flow from the reboiler;

(f) taking the liquid flow in the feed tray as the sum of the liquid flow from the condenser and the feed stream flow;

(g) assuming that all of the trays have 100% efficiency;

(h) assuming there is no interaction between the vapor and liquid flows through the compartments with multiple trays; and (i) generating a set of initial values for a regular model of the process.

A computer executable model for a multi-stage separation process having feed trays, reboiler return trays and condenser return trays and one or more additional trays. The model comprises:

(a) each of the one or more additional trays lumped into an associated compartment that comprises one or more of the one or more additional trays that are not in another associated compartment;

(b) the feed trays, reboiler return trays and the condenser return trays each treated as one tray compartments;

(c) one of the one or more additional trays in each of the associated compartments comprising one or more additional trays designated as a sensitive tray;

(d) liquid holdup in each of the compartments equated to the total liquid holdup of the trays in each of the compartments;

(e) vapor holdup in each of the compartments ignored;

(f) phase equilibria in an associated compartment calculated only for the sensitive tray;

(g) all trays other than the sensitive trays in each of the associated compartments are presumed to respond instantaneously to liquid and vapor flow;

(h) temperatures of all trays other than the sensitive trays in each of the associated compartments are based on linear interpolation between the temperature at each of two adjacent sensitive trays; and (i) causing the regular model to converge to a solution.

A computer executable model having differential equations for a multi-stage separation process having feed trays for receiving a feed stream flow, reboiler return trays for providing a liquid flow to a reboiler and receiving from the reboiler a vapor flow and condenser return trays for providing a vapor flow to a condenser and receiving from the condenser a liquid flow and one or more compartments with multiple trays having vapor and liquid streams flowing therethrough. The model comprises:

(a) all of the differential equations converted to steady state equations by setting the derivative term of all of the differential equations to zero;

(b) the temperature of the condenser return tray is taken as the average of the temperatures of the liquid flow from the condenser and the feed stream flow;

(c) the temperature of the reboiler return tray is taken as the average of the temperatures of the vapor flow from the reboiler and the feed stream flow;

(d) taking the liquid flow in the condenser return tray to be the same as the liquid flow from the condenser;

(e) taking the vapor flow in the reboiler return tray to be the same as the vapor flow from the reboiler;

(f) taking the liquid flow in the feed tray as the sum of the liquid flow from the condenser and the feed stream flow;

(g) assuming that all of the trays have 100% efficiency;

(h) assuming there is no interaction between the vapor and liquid flows through the compartments with multiple trays; and (i) generating a set of initial values for a regular model of the process.

DESCRIPTION OF THE DRAWING

FIG. 1, the only drawing FIGURE, shows a distillation column as one example of a multi-staged separation process to which the present invention can be applied.

DESCRIPTION OF THE PREFERRED EMBODIMENT(S)

FIG. 1 shows a section of a distillation column 10, a typical staged separation process, in which a stream of fresh feed 12$a$ is introduced into the column 10 and separated into groups of components. The column 10 includes a number of horizontal trays 30$a$ to 30$o$ which provide the surfaces on which mass transfer (component exchange) can take place between the cold liquid 12$b$ returning from a condenser (not shown) and flowing downward from the top of column 10 and the hot vapor 12$c$ returning from a reboiler (not shown) and flowing upward from the bottom of column 10.

As is shown in FIG. 1 and in accordance with the present invention, several trays such as those in compartments 14, 16, 18 are treated as a single entity for simulation purposes. Compartment 14 has trays 30$b$, 30$c$, 30$d$, 30$e$; compartment 16 has trays 30$f$, 30$g$, 30$h$, 30$i$; and compartment 18 has trays 30$k$, 30$l$, 30$m$, 30$n$.

Column 10 also includes a top compartment 20 that has a single condenser return tray 30$a$. Compartment 20 provides the hot vapor 12$d$ flowing upward to the condenser and receives the cold liquid 12$b$ returning from the condenser. Column 10 also has a feed compartment 22 that has a single feed tray 30$j$ which receives the stream 12$a$ of fresh feed. Column 10 further has a bottom compartment 24 that has a single reboiler return tray 30$o$. Compartment 24 receives the upwardly flowing hot vapor 12$c$ from the reboiler and provides the downwardly flowing cold liquid 12$e$ to the reboiler.

As is well known the distillation column 10 includes a rectifying section and a stripping section. The rectifying section consists of the trays directly above the feed compartment 22 and thus includes compartments 14 and 16. The stripping section consists of the trays directly below the feed compartment 22 and thus includes compartment 18.

The present invention provides guidelines for creating a regular model for a staged separation process which in this example is a distillation column. These guidelines should be used in the context of the basic separation model formulation known as the MESH equations. As is well known, the MESH equations are the mass and component balance equations, phase equilibrium equations, summation equations, and enthalpy (energy) balance equations. For rigorous modeling, the MESH equations are applied to each tray or section of a staged process. The guidelines of the present invention for creating the regular model for the process which are given below represent a deviation from the normal practice. The result of using these guidelines is a computer executable regular model of the multi-stage separation process that has all of the features called for in the guidelines.

The guidelines for creating the regular model for the staged separation process are:

1. Several trays are, as is described above, lumped into a compartment as is shown in FIG. 1 for compartments 14, 16 and 18. One of the trays in each of compartments 14, 16 and 18 is taken to be the "sensitive" tray of that compartment. The sensitive tray may be any tray in the compartment, for example, the middle tray in each of compartments 14, 16 and 18.

2. Feed trays such as tray 30$j$, reboiler return trays such as tray 30$o$, and condenser return trays such as tray 30$a$ are not lumped. They are treated as one-tray compartments as is shown in FIG. 1 for compartments 20, 22 and 24.

3. The liquid holdup in a compartment is equal to the total holdup of the constituent trays. As is well known the liquid holdup is the liquid that is consistently moving through a tray.
4. Vapor holdup is ignored. As is well known the response to a change in vapor is much faster than a response to a change in liquid. Tray delta pressure is a parameter to be estimated, for example, from overhead and bottom pressure measurements.
5. Phase equilibria in a multi tray compartment are calculated only for the sensitive trays and not for all of the individual trays. As is well known phase equilibria depends on the pressure, temperature and composition of a mixture.
6. The compositions, vapor flowrates, and liquid flowrates of the non-sensitive trays, that is the the trays in a multi-tray compartment other than a sensitive tray are based on steady state balances with respect to the sensitive tray, and with vapor-liquid equilibrium ratios the same as those for the sensitive tray. In other words, the non-sensitive trays are presumed to respond instantaneously to changes in liquid and vapor flow.
7. Temperatures of the non-sensitive trays are based on linear interpolation between the temperature at each of the two adjacent sensitive trays.

The guidelines described above for creating the regular model for the process solves the problem of failure to converge to a solution that exists in the methods of the prior art compartmental approach to a distillation column.

To solve the problem of initialization failure, a separate computer executable model is used to generate a set of initial values for the regular model for the staged separation process. This computer executable initialization model is similar to the regular model as described above but with the following additional features:

1. All differential equations that are in the regular model are converted to steady state equations by setting the derivative terms to zero.
2. The top tray 30a temperature is taken to be the average of the condenser return and the feed temperatures. Likewise, the bottom tray 30o temperature is taken to be the average of the reboiler return and the feed temperatures.
3. The top tray liquid flow 30a is taken to be the same as the condenser return flow 12d. The feed tray 30j liquid flow is the sum of the top and feed flows. The bottom tray 30o vapor flow is the same as the reboiler return flow 12e.
4. Tray efficiency is assumed to be 100% for all trays.
5. There is no interaction between the vapor and liquid streams in both the rectifying and the stripping sections.

The guidelines of the present invention described above for setting up the regular model for the distillation column 10 and for setting up the initialization model for column 10 can also be applied to the modeling and simulation of other types of multi-staged separation processes, e.g., a packed tower. As is well known, a packed tower is a cylindrical column filled with a mass of inert solid shapes called tower packing. The liquid, distributed from above, uniformly wets the surfaces of the packing as it flows down the column. The vapor, fed from below, flows upward through the interstices in the packing. The packing thus provides a large area of surface on which mass transfer can take place between the liquid and the vapor.

A packed tower may be simulated as a distillation column with multiple trays. The equivalent number of trays in a packed column may be calculated from the column height and a parameter known as the height equivalent to a theoretical plate (HETP). The HETP is usually in the range of 1 to 2 feet depending on the type of packing used. Therefore, a 30-ft packed column may be simulated as a distillation column with 15 to 30 trays. Once the number of equivalent trays is determined, the guidelines as described in the previous sections may be applied to the simulation of the packed column.

Thus as can be appreciated from the description above the guidelines of the present invention can be used with any multi-stage separation process.

As can be appreciated the present invention, contrary to the prior art which stipulates that dynamic component balances are to be performed for all the trays, calls for steady-state component balances to be performed for the non-sensitive trays only. Further, instead of constant volatilities, constant vapor-liquid equilibrium ratios are used for the non-sensitive trays. These lead to faster and more robust numerical solutions for on-line applications.

As can also be appreciated the combined effect of the features of the initialization model developed in accordance with the guidelines described herein allows the initialization model to generate a set of initial values for the regular model without which the regular model would often fail to initialize.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A medium having instructions which when executed perform steps for creating a regular model for a multi-stage separation process having feed trays, reboiler return trays and condenser return trays and one or more additional trays that allows said regular model to converge to a solution comprising:
    (a) lumping each of said one or more additional trays into an associated compartment that comprises one or more of said one or more additional trays that are not in another associated compartment;
    (b) treating said feed trays, reboiler return trays and said condenser return trays as one tray compartments;
    (c) designating one of said one or more additional trays in each of said associated compartments comprising one or more additional trays as a sensitive tray;
    (d) equating liquid holdup in each of said compartments to the total liquid holdup of the trays in each of said compartments;
    (e) ignoring vapor holdup in each of said compartments;
    (f) calculating phase equilibria in an associated compartment only for said sensitive tray;
    (g) presuming that all trays other than said sensitive trays in each of said associated compartments respond instantaneously to liquid and vapor flow;
    (h) basing temperatures of all trays other than said sensitive trays in each of said associated compartments on linear interpolation between the temperature at each of two adjacent sensitive trays; and
    (i) causing the regular model to converge to a solution.

2. The medium of claim 1 further having instructions which when executed perform steps for creating an initialization model for said process, said feed trays for receiving a feed stream flow, said reboiler return trays for providing a liquid flow to a reboiler and receiving from said reboiler a vapor flow and said condenser return trays for providing a vapor flow to a condenser and receiving from said condenser a liquid flow, said additional trays having vapor and liquid streams flowing therethrough, said instructions for performing steps for creating an initialization model generating a set of initial values for said regular model, said further instructions comprising:
(a) converting all differential equations in said regular model to steady state equations by setting the derivative term of all of said differential equations to zero;
(b) taking the temperature of said condenser return tray as the average of the temperatures of said liquid flow from said condenser and said feed stream flow;
(c) taking the temperature of said reboiler return tray as the average of the temperatures of said vapor flow from said reboiler and said feed stream flow;
(d) taking the liquid flow in said condenser return tray to be the same as said liquid flow from said condenser;
(e) taking the vapor flow in said reboiler return tray to be the same as said vapor flow from said reboiler;
(f) taking the liquid flow in said feed tray as the sum of said liquid flow from said condenser and said feed stream flow;
(g) assuming that all of said trays have 100% efficiency;
(h) assuming there is no interaction between said vapor and liquid flows through said compartments with one or more additional trays; and
(i) generating a set of initial values for a regular model of said process.

3. A medium having instructions which when executed perform steps for creating an initialization model for a multi-stage separation process having feed trays for receiving a feed stream flow, reboiler return trays for providing a liquid flow to a reboiler and receiving from said reboiler a vapor flow and condenser return trays for providing a vapor flow to a condenser and receiving from said condenser a liquid flow and one or more compartments with multiple trays having vapor and liquid streams flowing therethrough that generates a set of initial values for a regular model of said process, comprising:
(a) converting all differential equations in said regular model to steady state equations by setting the derivative term of all of said differential equations to zero;
(b) taking the temperature of said condenser return tray as the average of the temperatures of said liquid flow from said condenser and said feed stream flow;
(c) taking the temperature of said reboiler return tray as the average of the temperatures of said vapor flow from said reboiler and said feed stream flow;
(d) taking the liquid flow in said condenser return tray to be the same as said liquid flow from said condenser;
(e) taking the vapor flow in said reboiler return tray to be the same as said vapor flow from said reboiler;
(f) taking the liquid flow in said feed tray as the sum of said liquid flow from said condenser and said feed stream flow;
(g) assuming that all of said trays have 100% efficiency;
(h) assuming there is no interaction between said vapor and liquid flows through said compartments with multiple trays; and
(i) generating a set of initial values for a regular model of said process.

4. A method for creating a regular model for a multi-stage separation process having feed trays, reboiler return trays and condenser return trays and one or more additional trays that allows said regular model to converge to a solution comprising:
(a) lumping each of said one or more additional trays into an associated compartment that comprises one or more of said one or more additional trays that are not in another associated compartment;
(b) treating said feed trays, reboiler return trays and said condenser return trays as one tray compartments;
(c) designating one of said one or more additional trays in each of said associated compartments comprising one or more additional trays as a sensitive tray;
(d) equating liquid holdup in each of said compartments to the total liquid holdup of the trays in each of said compartments;
(e) ignoring vapor holdup in each of said compartments;
(f) calculating phase equilibria in an associated compartment only for said sensitive tray;
(g) presuming that all trays other than said sensitive trays in each of said associated compartments respond instantaneously to liquid and vapor flow;
(h) basing temperatures of all trays other than said sensitive trays in each of said associated compartments on linear interpolation between the temperature at each of two adjacent sensitive trays; and
(i) causing the regular model to converge to a solution.

5. The method of claim 4 wherein said feed trays are for receiving a feed stream flow, said reboiler return trays are for providing a liquid flow to a reboiler and receiving from said reboiler a vapor flow and said condenser return trays are for providing a vapor flow to a condenser and receiving from said condenser a liquid flow, said additional trays have vapor and liquid streams flowing therethrough, said method also for creating an initialization model generating a set of initial values for said regular model and further comprising:
(a) converting all of the differential equations in said regular model to steady state equations by setting the derivative term of all of said differential equations to zero;
(b) taking the temperature of said condenser return tray as the average of the temperatures of said liquid flow from said condenser and said feed stream flow;
(c) taking the temperature of said reboiler return tray as the average of the temperatures of said vapor flow from said reboiler and said feed stream flow;
(d) taking the liquid flow in said condenser return tray to be the same as said liquid flow from said condenser;
(e) taking the vapor flow in said reboiler return tray to be the same as said vapor flow from said reboiler;
(f) taking the liquid flow in said feed tray as the sum of said liquid flow from said condenser and said feed stream flow;
(g) assuming that all of said trays have 100% efficiency;
(h) assuming there is no interaction between said vapor and liquid flows through said compartments with one or more additional trays; and
(i) generating a set of initial values for a regular model of said process.

6. A method of process engineering which comprises creating a regular model for a multi-stage separation process having feed trays, reboiler return trays and condenser return trays and one or more additional trays that allows said regular model to converge to a solution according to prescribed guidelines,
said guidelines comprising:
(a) lumping each of said one or more additional trays into an associated compartment that comprises one or more of said one or more additional trays that are not in another associated compartment;
(b) treating said feed trays, reboiler return trays and said condenser return trays as one tray compartments;

(c) designating one of said one or more additional trays in each of said associated compartments comprising one or more additional trays as a sensitive tray;

(d) equating liquid holdup in each of said compartments to the total liquid holdup of the trays in each of said compartments;

(e) ignoring vapor holdup in each of said compartments;

(f) calculating phase equilibria in an associated compartment only for said sensitive tray;

(g) presuming that all trays other than said sensitive trays in each of said associated compartments respond instantaneously to liquid and vapor flow;

(h) basing temperatures of all trays other than said sensitive trays in each of said associated compartments on linear interpolation between the temperature at each of two adjacent sensitive trays; and (i) causing the regular model to converge to a solution.

7. The method of claim 6 wherein said feed trays are for receiving a feed stream flow, said reboiler return trays are for providing a liquid flow to a reboiler and receiving from said reboiler a vapor flow and said condenser return trays are for providing a vapor flow to a condenser and receiving from said condenser a liquid flow, said additional trays have vapor and liquid streams flowing therethrough, and said guidelines further comprise:

(a) converting all of the differential equations in said regular model to steady state equations by setting the derivative term of all of said differential equations to zero;

(b) taking the temperature of said condenser return tray as the average of the temperatures of said liquid flow from said condenser and said feed stream flow;

(c) taking the temperature of said reboiler return tray as the average of the temperatures of said vapor flow from said reboiler and said feed stream flow;

(d) taking the liquid flow in said condenser return tray to be the same as said liquid flow from said condenser;

(e) taking the vapor flow in said reboiler return tray to be the same as said vapor flow from said reboiler;

(f) taking the liquid flow in said feed tray as the sum of said liquid flow from said condenser and said feed stream flow;

(g) assuming that all of said trays have 100% efficiency;

(h) assuming there is no interaction between said vapor and liquid flows through said compartments with one or more additional trays; and (i) generating a set of initial values for a regular model of said process.

8. A method for creating an initialization model for a multi-stage separation process having feed trays for receiving a feed stream flow, reboiler return trays for providing a liquid flow to a reboiler and receiving from said reboiler a vapor flow and condenser return trays for providing a vapor flow to a condenser and receiving from said condenser a liquid flow and one or more compartments with multiple trays having vapor and liquid streams flowing therethrough that generates a set of initial values for a regular model of said process, comprising:

(a) converting all of the differential equations in said regular model to steady state equations by setting the derivative term of all of said differential equations to zero;

(b) taking the temperature of said condenser return tray as the average of the temperatures of said liquid flow from said condenser and said feed stream flow;

(c) taking the temperature of said reboiler return tray as the average of the temperatures of said vapor flow from said reboiler and said feed stream flow;

(d) taking the liquid flow in said condenser return tray to be the same as said liquid flow from said condenser;

(e) taking the vapor flow in said reboiler return tray to be the same as said vapor flow from said reboiler;

(f) taking the liquid flow in said feed tray as the sum of said liquid flow from said condenser and said feed stream flow;

(g) assuming that all of said trays have 100% efficiency;

(h) assuming there is no interaction between said vapor and liquid flows through said compartments with multiple trays; and (i) generating a set of initial values for a regular model of said process.

9. A method of process engineering which comprises creating an initialization model for a multi-stage separation process having feed trays for receiving a feed stream flow, reboiler return trays for providing a liquid flow to a reboiler and receiving from said reboiler a vapor flow and condenser return trays for providing a vapor flow to a condenser and receiving from said condenser a liquid flow and one or more compartments with multiple trays having vapor and liquid streams flowing therethrough that generates a set of initial values for a regular model of said process, according to prescribed guidelines, said guidelines comprising:

(a) converting all differential equations in said regular model to steady state equations by setting the derivative term of all of said differential equations to zero;

(b) taking the temperature of said condenser return tray as the average of the temperatures of said liquid flow from said condenser and said feed stream flow;

(c) taking the temperature of said reboiler return tray as the average of the temperatures of said vapor flow from said reboiler and said feed stream flow;

(d) taking the liquid flow in said condenser return tray to be the same as said liquid flow from said condenser;

(e) taking the vapor flow in said reboiler return tray to be the same as said vapor flow from said reboiler;

(f) taking the liquid flow in said feed tray as the sum of said liquid flow from said condenser and said feed stream flow;

(g) assuming that all of said trays have 100% efficiency;

(h) assuming there is no interaction between said vapor and liquid flows through said compartments with multiple trays; and (i) generating a set of initial values for a regular model of said process.

10. A computer executable model for a multi-stage separation process having feed trays, reboiler return trays and condenser return trays and one or more additional trays comprising:

(a) each of said one or more additional trays lumped into an associated compartment that comprises one or more of said one or more additional trays that are not in another associated compartment;

(b) said feed trays, reboiler return trays and said condenser return trays each treated as one tray compartments;

(c) one of said one or more additional trays in each of said associated compartments comprising one or more additional trays designated as a sensitive tray;

(d) liquid holdup in each of said compartments equated to the total liquid holdup of the trays in each of said compartments;

(e) vapor holdup in each of said compartments ignored;
(f) phase equilibria in an associated compartment calculated only for said sensitive tray;
(g) all trays other than said sensitive trays in each of said associated compartments are presumed to respond instantaneously to liquid and vapor flow;
(h) temperatures of all trays other than said sensitive trays in each of said associated compartments are based on linear interpolation between the temperature at each of two adjacent sensitive trays; and
(i) causing the regular model to converge to a solution.

11. The computer executable model of claim 10 wherein said feed trays are for receiving a feed stream flow, said reboiler return trays are for providing a liquid flow to a reboiler and receiving from said reboiler a vapor flow and said condenser return trays are for providing a vapor flow to a condenser and receiving from said condenser a liquid flow, said additional trays have vapor and liquid streams flowing therethrough, said model further comprising:
   (a) all differential equations in said computer executable model are converted to steady state equations by setting the derivative term of all of said differential equations to zero;
   (b) the temperature of said condenser return tray is taken as the average of the temperatures of said liquid flow from said condenser and said feed stream flow;
   (c) the temperature of said reboiler return tray is taken as the average of the temperatures of said vapor flow from said reboiler and said feed stream flow;
   (d) taking the liquid flow in said condenser return tray to be the same as said liquid flow from said condenser;
   (e) taking the vapor flow in said reboiler return tray to be the same as said vapor flow from said reboiler;
   (f) taking the liquid flow in said feed tray as the sum of said liquid flow from said condenser and said feed stream flow;
   (g) assuming that all of said trays have 100% efficiency;
   (h) assuming there is no interaction between said vapor and liquid flows through said compartments with multiple trays; and
   (i) generating a set of initial values for a regular model of said process.

12. A computer executable model for a multi-stage separation process having feed trays for receiving a feed stream flow, reboiler return trays for providing a liquid flow to a reboiler and receiving from said reboiler a vapor flow and condenser return trays for providing a vapor flow to a condenser and receiving from said condenser a liquid flow and one or more compartments with multiple trays having vapor and liquid streams flowing therethrough comprising:
   (a) all differential equations in said computer executable model converted to steady state equations by setting the derivative term of all of said differential equations to zero;
   (b) the temperature of said condenser return tray is taken as the average of the temperatures of said liquid flow from said condenser and said feed stream flow;
   (c) the temperature of said reboiler return tray is taken as the average of the temperatures of said vapor flow from said reboiler and said feed stream flow;
   (d) taking the liquid flow in said condenser return tray to be the same as said liquid flow from said condenser;
   (e) taking the vapor flow in said reboiler return tray to be the same as said vapor flow from said reboiler;
   (f) taking the liquid flow in said feed tray as the sum of said liquid flow from said condenser and said feed stream flow;
   (g) assuming that all of said trays have 100% efficiency;
   (h) assuming there is no interaction between said vapor and liquid flows through said compartments with multiple trays; and
   (i) generating a set of initial values for a regular model of said process.

\* \* \* \* \*